(12) United States Patent
Han et al.

(10) Patent No.: US 11,403,828 B2
(45) Date of Patent: Aug. 2, 2022

(54) IN-CAR CLOUD VR DEVICE AND METHOD

(71) Applicant: IMMERSIVECAST CO., LTD., Seoul (KR)

(72) Inventors: Jang Hee Han, Seongnam-si (KR); Kwang Il Jung, Seoul (KR); Jae Hyeon Joo, Suwon-si (KR); Jong Hyeock Lim, Suwon-si (KR)

(73) Assignee: IMMERSIVECAST CO., LTD., Seoul (KR)

( * ) Notice: Subject to any disclaimer, the term of this patent is extended or adjusted under 35 U.S.C. 154(b) by 0 days.

(21) Appl. No.: 17/142,193

(22) Filed: Jan. 5, 2021

(65) Prior Publication Data
US 2021/0366194 A1 Nov. 25, 2021

(30) Foreign Application Priority Data
May 25, 2020 (KR) .......................... 10-2020-0062429

(51) Int. Cl.
| | |
|---|---|
| *G06T 19/00* | (2011.01) |
| *H04N 7/18* | (2006.01) |
| *G06F 3/01* | (2006.01) |
| *G01C 21/36* | (2006.01) |
| *H04N 13/383* | (2018.01) |

(Continued)

(52) U.S. Cl.
CPC ........ *G06T 19/006* (2013.01); *G01C 21/3647* (2013.01); *G01S 19/42* (2013.01); *G06F 3/012* (2013.01); *G06T 3/40* (2013.01); *G06V 20/49* (2022.01); *H04N 7/18* (2013.01); *H04N 13/161* (2018.05); *H04N 13/383* (2018.05)

(58) Field of Classification Search
CPC ....... G06T 19/006; G06T 3/40; H04N 13/383; H04N 13/161; H04N 7/18; G01C 21/3647; G01S 19/42; G06F 3/012; G06K 9/00765
See application file for complete search history.

(56) References Cited

U.S. PATENT DOCUMENTS

| | | | | |
|---|---|---|---|---|
| 2008/0259199 A1* | 10/2008 | Sako | .................... | G01C 21/36 348/333.01 |
| 2014/0354688 A1* | 12/2014 | Min | ...................... | G06F 3/013 345/633 |

(Continued)

FOREIGN PATENT DOCUMENTS

| | | |
|---|---|---|
| KR | 10-0820132 B1 | 4/2008 |
| KR | 10-2014-0141319 A | 12/2014 |

(Continued)

*Primary Examiner* — Terrell M Robinson
(74) *Attorney, Agent, or Firm* — Revolution IP, PLLC (57) ABSTRACT

An in-car cloud VR device includes: a GIS information acquisition unit that detects a location of a vehicle through a GPS sensor installed in a traveling vehicle and acquires the GIS information near the vehicle; an thing information acquisition unit that collects videos around the vehicle through at least one camera sensor installed in the vehicle and acquires surrounding thing information around the vehicle; a movement information acquisition unit that acquires movement information of a user in the vehicle through at least one gyro sensor; and an FOV video determination unit that determines a first FOV video based on the GIS information, updates the first FOV video based on the surrounding thing information, and determines a second FOV video within the first FOV video based on the movement information of the user.

7 Claims, 6 Drawing Sheets

(51) Int. Cl.
*H04N 13/161* (2018.01)
*G01S 19/42* (2010.01)
*G06T 3/40* (2006.01)
*G06V 20/40* (2022.01)

(56) References Cited

U.S. PATENT DOCUMENTS

| | | | |
|---|---|---|---|
| 2015/0097860 A1* | 4/2015 | Aneliz | G06T 11/60 345/633 |
| 2019/0050664 A1* | 2/2019 | Yang | G06T 19/006 |
| 2020/0316462 A1* | 10/2020 | Raghoebardajal | G06F 3/012 |
| 2020/0361482 A1* | 11/2020 | Choi | G01C 21/3833 |

FOREIGN PATENT DOCUMENTS

| | | | | |
|---|---|---|---|---|
| KR | 10-2018-0025366 A | | 3/2018 | |
| KR | 20180025366 A | * | 3/2018 | ........... H04N 21/431 |
| KR | 10-2018-0132922 A | | 12/2018 | |
| KR | 10-1931295 B1 | | 12/2018 | |
| KR | 101931295 B1 | * | 12/2018 | ........... H04N 21/431 |

* cited by examiner

IN-CAR CLOUD VR DEVICE AND METHOD

BACKGROUND OF THE DISCLOSURE

Field of the Disclosure

The present disclosure relates to an in-car cloud VR technology, and more particularly, to an in-car cloud VR device and method capable of adaptively responding to traveling conditions and providing a realistic video to a user in a traveling vehicle.

Related Art

Recently, virtual reality (VR) devices have appeared, but are not widely spread like smartphones due to problems such as high price, low resolution that hinders a sense of immersion, and a lack of VR content. In particular, physical discomfort such as dizziness that may occur due to a discrepancy between a user's head movement and a visible VR video may be a problem that needs to be resolved. To solve this problem, motion-to-photon (MTP) redundancy needs to be reduced to be within 10 to 20 ms. To achieve this, there are technical difficulties in a wireless environment (for example, WiFi, mobile network, or the like).

Korean Patent No. 10-0820132 (2008 Apr. 1) relates to a method and system for image intra-prediction mode estimation, transfer, and organization, and discloses a technology capable of improving efficiency of a coding process by providing a method and system for estimating a pixel prediction mode used in a video encoding or decoding process, transferring a pixel prediction mode between a video encoder and decoder, and ordering an intra-prediction mode of a pixel.

RELATED ART DOCUMENT

[Patent Document]
(Patent Document 0001) Korean Patent No. 10-0820132 (2008 Apr. 1)

SUMMARY OF THE DISCLOSURE

The present disclosure provides an in-car cloud VR device and method capable of adaptively responding to traveling conditions and providing a realistic video to a user in a traveling vehicle.

The present disclosure also provides an in-car cloud VR device and method capable of overcoming a limitation of a physical space of the existing VR device and providing an effective VR/AR videos even under vehicle traveling conditions.

The present disclosure also provides an in-car cloud VR device and method capable of processing a video in real time through hybrid interworking between a cloud server and a VR device.

In an aspect, an in-car cloud VR device is provided. The in-car cloud VR device includes: a GIS information acquisition unit that detects a location of a vehicle through a GPS sensor installed in a traveling vehicle and acquires the GIS information near the vehicle; an thing information acquisition unit that collects videos around the vehicle through at least one camera sensor installed in the vehicle and acquires surrounding thing information around the vehicle; a movement information acquisition unit that acquires movement information of a user in the vehicle through at least one gyro sensor; and an FOV video determination unit that determines a first FOV video based on the GIS information, updates the first FOV video based on the surrounding thing information, and determines a second FOV video within the first FOV video based on the movement information of the user.

The GIS information acquisition unit may match the GPS signal acquired from the GPS sensor with GIS coordinates defined on a digital map and then acquire the GIS information.

The thing information acquisition unit may divide the video into a plurality of frames, identify at least one dynamic object by image analysis for each frame, and acquire object information on the at least one dynamic object from a previously constructed object DB as the surrounding thing information.

The movement information acquisition unit may measure head movement associated with the user's head through the at least one gyro sensor, and generate head coordinate data on the head movement to determine a user's gaze direction.

The FOV video determination unit may determine, as the first FOV video, a stereoscopic video of a 360° field of view centered on a location of the vehicle based on the GIS information, and synthesize virtual graphic corresponding to the surrounding thing information with the stereoscopic video to perform the update.

The FOV video determination unit may determine the second FOV video according to the gaze direction corresponding to the user's head movement, and perform Foveated Rendering on the first FOV video when the gaze direction is maintained for a predetermined time or longer to increase a resolution of an actual field of view expressed by the second FOV video.

The FOV video determination unit may include an FOV determination module that receives information on the movement of vehicle and the user to determine the field of view (FOV) according to the location of the vehicle and the user's gaze direction, a gaze video capture module that captures a gaze video for the FOV, and a video encoding module that encodes the gaze video to generate stereoscopic video expressed to the user.

In another aspect, an in-car cloud VR method is provided. The in-car cloud VR method includes: detecting a location of a vehicle through a GPS sensor installed in a traveling vehicle and acquiring the GIS information near the vehicle; collecting videos around the vehicle through at least one camera sensor installed in the vehicle and acquiring surrounding object information around the vehicle; acquiring movement information of a user in the vehicle through at least one gyro sensor; and determining a first FOV video based on the GIS information, updating the first FOV video based on the surrounding object information, and determining a second FOV video within the first FOV video based on the movement information of the user.

DESCRIPTION OF EXEMPLARY EMBODIMENTS

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Other expressions describing a relationship between components, that is, "between", "directly between", "neighboring to", "directly neighboring to" and the like, should be similarly interpreted.

It should be understood that the singular expression include the plural expression unless the context clearly indicates otherwise, and it will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

In each step, an identification code (for example, a, b, c, and the like) is used for convenience of description, and the identification code does not describe the order of each step, and each step may be different from the specified order unless the context clearly indicates a particular order. That is, the respective steps may be performed in the same sequence as the described sequence, be performed at substantially the same time, or be performed in an opposite sequence to the described sequence.

The present disclosure can be embodied as computer readable code on a computer readable recording medium, and the computer readable recording medium includes all types of recording devices in which data can be read by a computer system. Examples of the computer readable recording medium may include a read only memory (ROM), a random access memory (RAM), a compact disk read only memory (CD-ROM), a magnetic tape, a floppy disk, an optical data storage, or the like.

Unless defined otherwise, all the terms used herein including technical and scientific terms have the same meaning as meanings generally understood by those skilled in the art to which the present disclosure pertains. It should be understood that the terms defined by the dictionary are identical with the meanings within the context of the related art, and they should not be ideally or excessively formally defined unless the context clearly dictates otherwise.

An in-car cloud VR device 100 according to the present disclosure may correspond to a device capable of minimizing dizziness while providing realistic VR/AR videos to a user in a traveling vehicle. The in-car cloud VR device 100 may generate a realistic video synchronized with the traveling conditions by using rich gyro information that can be obtained from various cameras and sensors installed in the vehicle and provide the generated realistic video to the user.

Therefore, the in-car cloud VR device 100 may solve the problems of the existing VR devices due to a limitation of a physical space while providing a realistic video to vehicle occupants.

Figure 1:
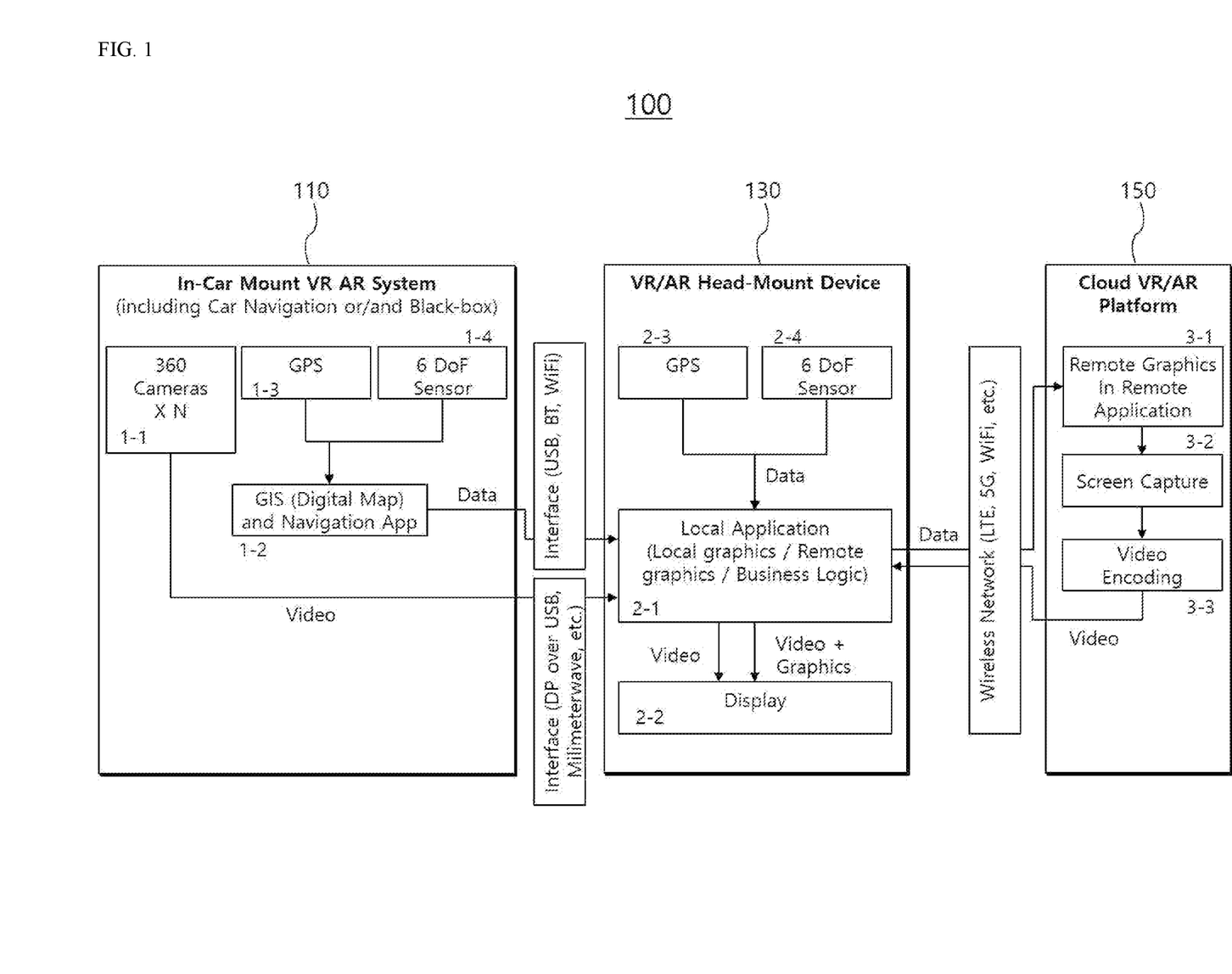
FIG. 1 is a conceptual diagram for describing an in-car cloud VR device according to an embodiment of the present disclosure.
Figure 7:
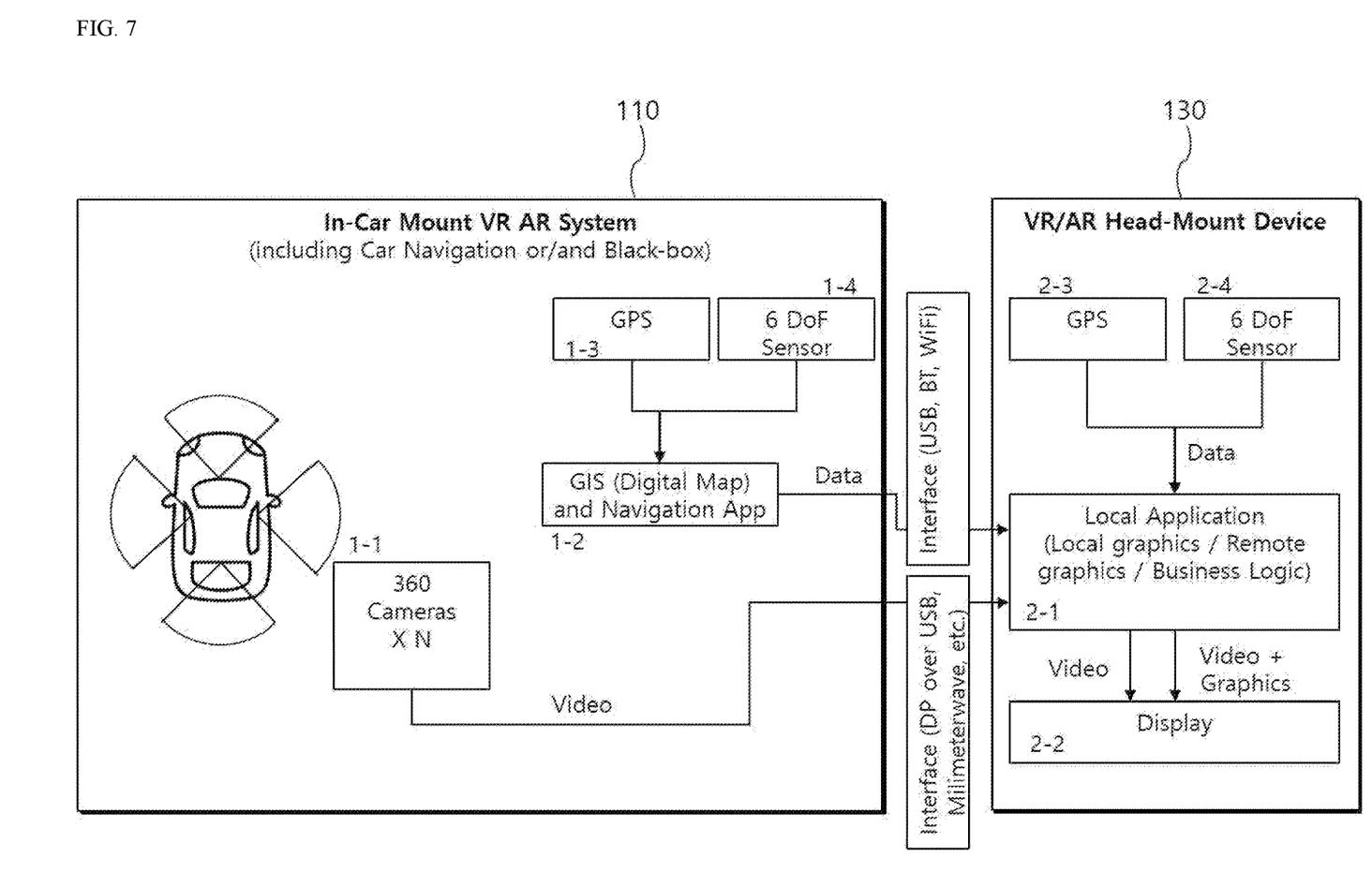
FIG. 7 is a conceptual diagram illustrating an operation between the first and second systems of FIG. 1.

FIG. 1 is a conceptual diagram for describing an in-car cloud VR device according to an embodiment of the present disclosure, and FIG. 7 is a conceptual diagram for describing an operation between first and second systems of FIG. 1.

Referring to FIGS. 1 and 7, the in-car cloud VR device 100 may include a first system 110, a second system 130, and a third system 150.

The first system 110 may collect video and GIS (digital map) data on a vehicle through a plurality of cameras, a GPS sensor, and a 6 DoF sensor that are installed therein, and may transmit the collected video and GIS data to the VR device worn by a user through a communication interface. Meanwhile, the first system 110 may include (a) N 360 cameras mounted around the vehicle, (b) a GPS device for location measurement, (c) a 6 DoF tracking sensor, (d) GIS and navigation application. Accordingly, the first system 110 may capture a 360° omnidirectional video and transmit the captured video to the second system 130 in real time.

The second system 130 may typically correspond to VR/AR glasses, and a user may directly wear a VR device to enjoy VR/AR videos. The second system 130 may be implemented by including the GPS sensor and the 6 DoF sensor by itself, and may display a video generated through a local application.

The second system 130 may basically include (a) a lens, (b) a display device, (c) an interface, (d) a 6 DoF sensor, and (e) motion tracking sensors, and may further include (f) a CPU, (g) a GPU, (h) a network modem, (i) a battery, and (j) an interface device that are built-in or externally included. The second system 130 may be configured in a standalone or all-in-one form including all of the above (f) to (j), or may be separately configured as a separate external device form.

Meanwhile, a local application 2-1 running in the second system 130 may perform the following operations. (a) The local application 2-1 may receive a video signal from a 360 camera 1-1, reprocess the received video signal, and then transmit the reprocessed video signal to display 2-2. (b) The local application 2-1 may receive data information of GIS and navigation application 1-2, reprocess the received data information, and then transmit the reprocessed data information to a display 2-2. (c) The local application 2-1 may receive data information on a GPS 2-3 and a 6 Dof sensor 2-4, reprocess the received data information, and transmit the reprocessed data information to the display 2-2. (d) The local application 2-1 provides data information necessary for a remote application 3-1 driven in a system 3 cloud VR system. (e) The local application 2-1 may receive the video signal transmitted through the processes 3-1, 3-2, and 3-3 in the third system 150, reprocess the received video signal, and transmit the reprocessed video signal to the display 2-2.

(f) The local application 2-1 may independently or complexly process the above operations (a) to (e). (g) The reprocessing process performed in the local application 2-1 may include color space conversion (RGB-YUV), video decoding, business logic processing, local GPU-based graphics rendering, graphics and video signal synthesis, remote GPU based graphic rendering (remote graphics), and the like.

The third system 150 may correspond to a cloud VR server. The third system 150 may determine an FOV for a user's gaze direction through remote application 3-1 and may perform image rendering based on the FOV. Thereafter, the third system 150 may perform screen capture 3-2 and video encoding 3-3. The third system 150 may transmit the generated video to the second system 130 through a wireless network. The wireless network may include LTE, 5G, WiFi, and the like.

Figure 2:
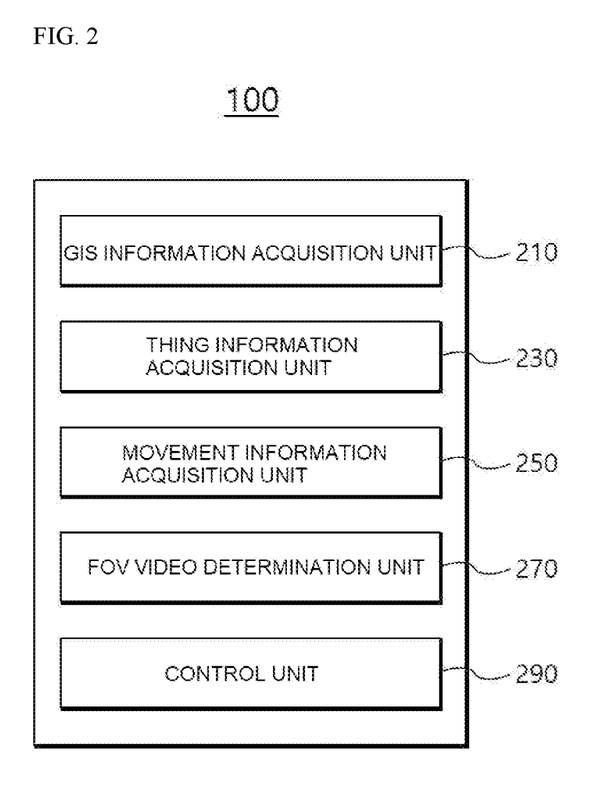
FIG. 2 is a diagram for describing a functional configuration of a cloud VR device according to the present disclosure.

FIG. 2 is a diagram illustrating the functional configuration of the in-car cloud VR device according to the present disclosure.

Referring to FIG. 2, the in-car cloud VR device 100 includes a GIS information acquisition unit 210, a thing information acquisition unit 230, a movement information acquisition unit 250, a FOV video determination unit 270, and a control unit 290.

The GIS information acquisition unit 210 may detect the location of the vehicle through the GPS sensor installed in the traveling vehicle and obtain the GIS information near the vehicle. Here, the vehicle is basically described by taking a car as an example, but is not necessarily limited thereto, and may include ships, airplanes, and the like, including boats and ships, and may include transportation means having gasoline-based power or electricity-based power. The GIS information may be acquired by accessing a database or an external system, and the GIS information acquisition unit 210 may acquire the GIS information based on GPS coordinates acquired through the GPS sensor.

In one embodiment, the GIS information acquisition unit 210 may match the GPS signal acquired from the GPS sensor with the GIS coordinates defined on the digital map and then acquire the GIS information. The GIS information may include coordinate information on a digital map constructed in 3D, and may include spatial information of 360° centered on a specific location on the digital map. That is, the GIS information acquired by the GIS information acquisition unit 210 may be used to generate videos around the vehicle as viewed from a gaze of an occupant who boards the vehicle.

The thing information acquisition unit 230 may collect videos around the vehicle through at least one camera sensor installed in the vehicle and acquire surrounding thing information around the vehicle. That is, objects moving around the vehicle, in particular, persons, are recognized based on the video captured during the movement of the vehicle and visualized in the stereoscopic video, which may be used to express the movement of the objects synchronized with the movement of the vehicle within the video that the occupant views using the VR device.

In one embodiment, the thing information acquisition unit 230 may divide the video into a plurality of frames, identify at least one dynamic object by image analysis for each frame, and acquire object information on the at least one dynamic object from a previously constructed object DB as the surrounding thing information. More specifically, the thing information acquisition unit 230 may identify moving objects by applying an artificial intelligence learning algorithm to a captured video or image, and classify the corresponding objects for each type. The thing information acquisition unit 230 may extract object information for each type from the object DB and acquire the extracted object information as the surrounding thing information on the corresponding object. The object DB may correspond to a database that includes identification information, appearance information, and basic operation information on various objects.

The movement information acquisition unit 250 may acquire movement information of a user who boards a vehicle through at least one gyro sensor. Meanwhile, the movement information acquisition unit 250 may be implemented to include a lens, a display device, and an interface motion tracking sensor, and may acquire the movement information of the user from the device that is mounted on the user's head and operated. In this case, the corresponding device may further include a CPU, a GPU, a network modem, a battery, and an interface device built-in or externally if necessary. In this case, the movement information of the user may include information on the body and head movement, and the user's body movement may be replaced by the movement of the vehicle and applied.

One embodiment, the movement information acquisition unit 250 may measure the head movement associated with the user's head through the at least one gyro sensor, and generate the head coordinate data on the head movement to determine the user's gaze direction. Meanwhile, the movement information acquisition unit 250 may additionally the use information acquired from the GPS sensor to generate the head coordinate data on the head movement.

The FOV video determination unit 270 may determine the first FOV video based on the GIS information, update the first FOV video based on the surrounding thing information, and determine the second FOV video within the first FOV video based on the movement information of the user. That is, the FOV video determination unit 270 may generate the first FOV video as a background video adaptively responding to the movement of the vehicle, and determine the second FOV video as a gaze video that adaptively responds to the movement of the user within the first FOV video.

In one embodiment, the FOV video determination unit 270 may determine a stereoscopic video of a 360° field of view centered on the location of the vehicle based on the GIS information as the first FOV video, and synthesize the virtual graphic corresponding to the surrounding thing information with the stereoscopic video to update the first FOV video. In this case, for the stereoscopic video around the vehicle, a real image may be used as a background, and for moving objects around the vehicle such as people or animals, virtual graphics corresponding to the corresponding objects may be used. That is, the updated first FOV video may be implemented as an augmented reality image in which a real image and a virtual image are integrated. On the other hand, the surrounding thing information added to the first FOV video may be generated based on the actual movement extracted through the image analysis, but is not necessarily limited thereto, and may be virtually generated through arbitrary settings.

In one embodiment, the FOV video determination unit 270 may determine the second FOV video according to the gaze direction corresponding to the user's head movement, and perform Foveated rendering on the first FOV video when the gaze direction is maintained for a predetermined time or longer to increase the resolution of the actual field of view expressed by the second FOV video. When the user's gaze direction is maintained for a predetermined time or longer, it may be determined that the user is watching the video of the corresponding gaze direction, and the FOV video determination unit 270 may perform the Foveated rendering on the first FOV video.

Here, the Foveated rendering may correspond to an image processing method in which an area that the user is interested in is processed in high resolution according to the user's gaze, and a portion other than the corresponding area is processed in a low resolution. The FOV video determination unit 270 may determine whether the user is gazing based on whether the head direction of the user changes, and more specifically, may determine whether the user is watching for a specific time while a rate of change of the gaze direction for a unit time is less than a reference rate of change.

When it is determined that the user is gazing, the FOV video determination unit 270 may perform rendering on the area, which the user is watching, in high resolution, and rendering on the remaining areas, that is, areas other than the gazing area, in low resolution. As a result, the FOV video determination unit 270 may differentially apply resolutions of the real image up to the actual field of view and the remaining image to an redundant image, and apply a relatively higher resolution to the real image. Meanwhile, the FOV video determination unit 270 may generate binocular videos as the stereoscopic video, respectively.

In one embodiment, the FOV video determination unit may include an FOV determination module that receives information on the movement of the vehicle and the user to determine the field of view (FOV) according to the location of the vehicle and the user's gaze direction, a gaze video capture module that captures a gaze video for the FOV, and a video encoding module that encodes the gaze video to generate the stereoscopic video expressed to the user. This will be described in more detail with reference to FIG. 4.

The control unit 290 may control the overall operation of the in-car cloud VR device 100, and may manage a control flow or a data control among the GIS information acquisition unit 210, the thing information acquisition unit 230, the movement information acquisition unit 250, and the FOV video determination units 270.

Figure 3:
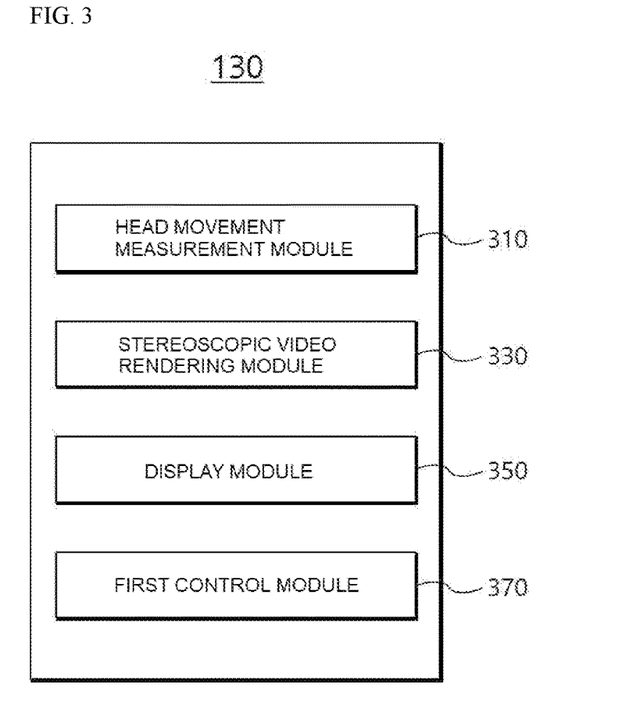
FIG. 3 is a diagram for describing a functional configuration of a second system of FIG. 1.

FIG. 3 is a diagram for describing a functional configuration of a second system of FIG. 1.

Referring to FIG. 3, the second system 130 may include a head movement measurement module 310, a stereoscopic video rendering module 330, a display module 350, and a first control module 370. Meanwhile, the FOV video determination unit 270 is a component of the second system 130 capable of detecting the user's gaze direction according to the user's head movement and playing the stereoscopic video in the corresponding light of sight direction, and may be implemented by a smartphone, VR/AR HMD, or the like.

The head movement measurement module 310 may generate head coordinate data on the head movement based on a signal measured from a gyro sensor. If necessary, the head movement measurement module 310 may receive and use the corresponding information from the movement information acquisition unit 250. The head coordinate data may include data on a center, a direction, and an inclination of the head. The head movement measurement module 310 may perform a validity check on signals received from each of the sensors, and may perform pre-processing on data normalization or data conversion into a specific format as necessary.

The stereoscopic video rendering module 330 may determine the user's gaze direction based on the head coordinate data and render the second FOV video according to the corresponding gaze direction. On the other hand, the stereoscopic video rendering module 330 may use the information received from each of the GIS information acquisition unit 210, the thing information acquisition unit 230, and the movement information acquisition unit 250, if necessary, to determine the user's gaze direction. When the user's gaze direction is determined, the stereoscopic video rendering module 330 may determine the user's field of view (FOV) for generating the second FOV video, and may generate the second FOV video according to the determined field of view.

In one embodiment, the stereoscopic video rendering module 330 may perform the Foveated rendering on the first FOV video when the user's gaze direction is maintained for a predetermined period of time or longer to increase the resolution of the second FOV video up to the actual field of view. When the user's gaze direction is maintained for a predetermined time or longer, it may be determined that the user is watching the vide of the corresponding gaze direction, and the stereoscopic video rendering module 330 may perform the Foveated rendering on the first FOV video.

The display module 350 may display the second FOV video. For example, the display module 350 may be implemented to include a display panel for playing a video, and may play a stereoscopic video generated by the stereoscopic video rendering module 330 in real time. Meanwhile, the stereoscopic video rendering module 330 may receive the updated first FOV video from the third system 150, and the display module 350 may receive and play the corresponding video.

The first control module 370 may control the overall operation of the second system 130, and may manage a control flow or a data flow between the head movement measurement module 310, the stereoscopic video rendering module 330, and the display module 350.

Figure 4:
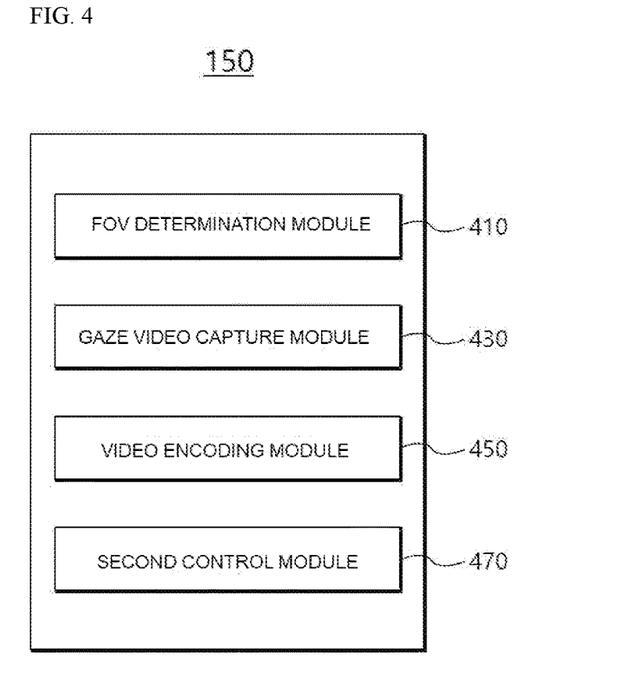
FIG. 4 is a diagram for describing a functional configuration of a third system of FIG. 1.

FIG. 4 is a diagram for describing a functional configuration of the third system of FIG. 1.

Referring to FIG. 4, the third system 150 may include an FOV determination module 410, a gaze video capture module 430, a video encoding module 450, and a second control module 470.

The FOV determination module 410 may receive the GIS information, the surrounding thing information, and the movement information of the user from the second system 130 to determine the field of view (FOV) according to the location of the vehicle and the user's gaze direction. The FOV determination module 410 may adaptively determine the user's field of view (FOV) based on the user's head direction. The third system 150 may update the stereoscopic video based on the field of view determined by the FOV determination module 410.

More specifically, the FOV determination module 410 may determine horizontal and vertical FOVs based on accelerations of the movement of the vehicle and the user's head movement. In this case, the movement of the vehicle may correspond to a change in a central axis.

For example, the FOV determination module 410 may set 210° in a horizontal direction and 130° in a vertical direction as a default field of view (FOV). The FOV determination module 410 may adjust a horizontal field of view (HFOV) between 210° and 360°, and a vertical field of view (VFOV) between 130° and 180°. Such field of view adjustment may be determined based on the acceleration of the head movement and the acceleration of the movement of the vehicle, respectively.

The gaze video capture module 430 may capture the gaze video for the FOV. That is, the area corresponding to the FOV determined by the FOV determination module 410 may be captured in the gaze video. Meanwhile, the gaze video capture module 430 may generate, as the gaze video, the binocular videos constituting the stereoscopic video.

The video encoding module 450 may encode the gaze video and transmit the encoded gaze video to the second system 130 as the first FOV video. More specifically, the video encoding module 450 may largely perform three types of encoding. The video encoding module 450 may perform standard advanced video coding (AVC) encoding, tile-based high efficiency video coding encoding, and perform encoding in which the redundancy for the stereoscopic video is removed. The video encoding module 450 does not encode the entire 360° video around the user, but encodes only the video including the corresponding FOV according to the FOV that is dynamically determined based on the user's head movement and the movement of the vehicle, thereby reducing the amount of data transmitted through the wireless network.

The second control module 470 may control the overall operation of the third system 150, and may manage a control flow or a data flow between the FOV determination module 410, the gaze video capture module 430, and the video encoding module 450.

Figure 5:
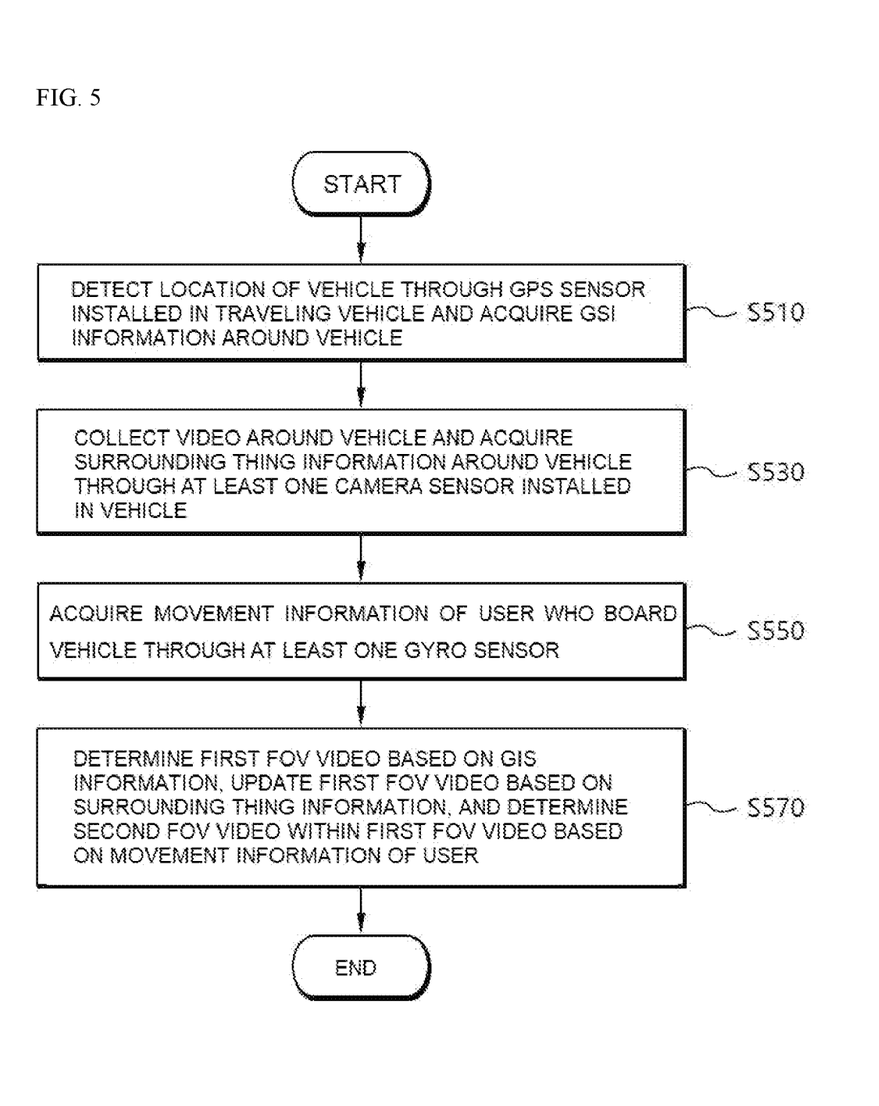
FIG. 5 is a flowchart for describing an in-car cloud VR process according to the present disclosure.

FIG. 5 is a flowchart for describing an in-car cloud VR process according to the present disclosure.

Referring to FIG. 5, the in-car cloud VR device 100 may detect the location of the vehicle through the GPS sensor installed in the traveling vehicle through the GIS information acquisition unit 210 and acquire the GIS information around the vehicle (step S510). The in-car cloud VR device 100 may collect videos around the vehicle through at least one camera sensor installed in the vehicle through the thing information acquisition unit 230 and acquire the surrounding thing information around the vehicle (step S530).

In addition, the in-car cloud VR device 100 may acquire the movement information of a user, who boards the vehicle, from the movement information acquisition unit 250 through at least one gyro sensor (step S550). The in-car cloud VR device 100 may determine the first FOV video based on the GIS information through the FOV video determination unit 270, update the first FOV video based on the surrounding thing information, and determine the second FOV video within the first FOV video based on the movement information of the user (step S570).

Figure 6:
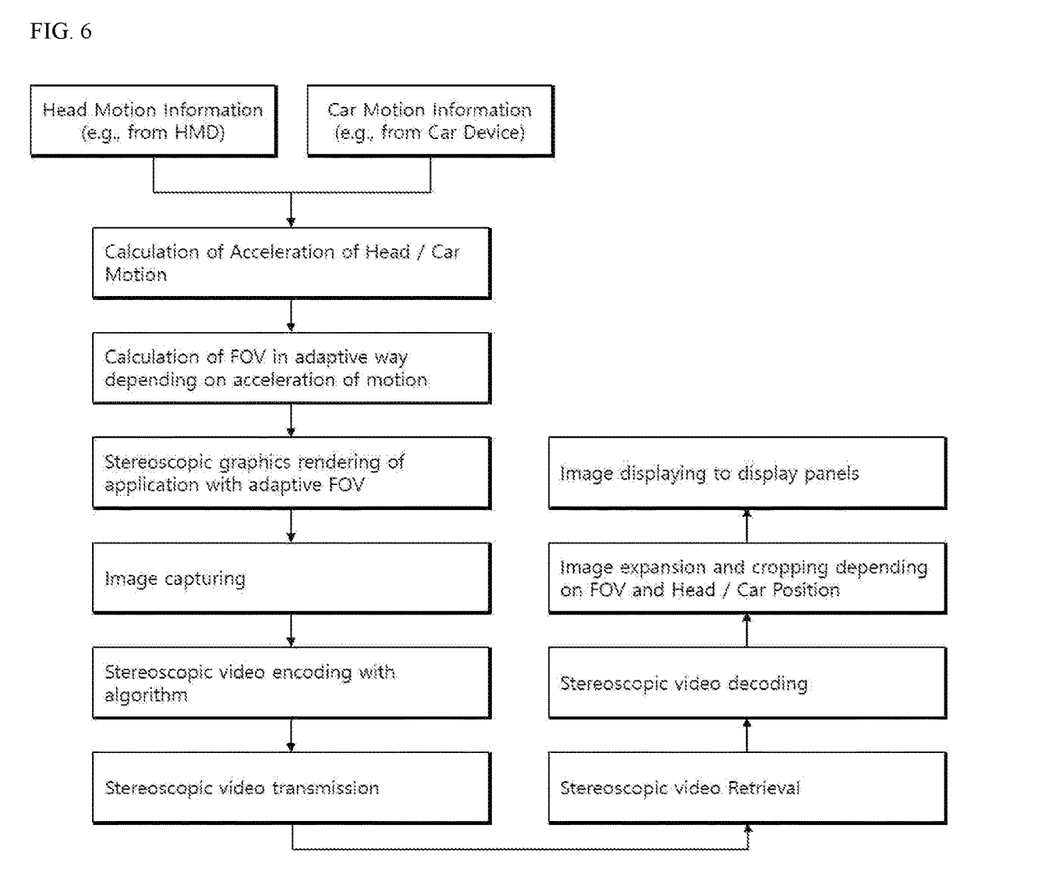
FIG. 6 is a flowchart for describing a process of generating and restoring a stereoscopic video according to the present disclosure.

FIG. 6 is a flowchart for describing a process of generating and restoring a stereoscopic video according to the present disclosure.

Referring to FIG. 6, a basic signal for image generation may be generated from an HMD device or a vehicle device, and the third system 150 may receive this generated basic signal and calculate accelerations of the user's head movement and the movement of the vehicle. In this case, the vehicle device may correspond to a navigation or black box installed in the vehicle. That is, the third system 150 may acquire the GIS information around the vehicle based on the information on the movement of the vehicle received from the vehicle device.

The third system 150 may dynamically calculate the user's FOV based on the accelerations of the user's head movement and the movement of the vehicle through the FOV determination module 410. In addition, the third system 150 may perform the graphics rendering for generating the stereoscopic video based on the calculated FOV.

In one embodiment, the graphic rendering may include an adaptive field of view selection (FOV Selection) step and a Foveated rendering step. The adaptive field of view selection step may dynamically determine the field of view based on the acceleration of the head movement and the acceleration of the vehicle movement within a specific range based on a basic setting angle. In the Foveated Rendering step, the image processing may be performed in high resolution for the area which the user is watching based on the field of view of the user and may be performed in low resolution for other areas.

In addition, the third system 150 may perform image capturing for capturing the rendered video. The third system 150 may generate video data to be wirelessly transmitted through video encoding. The video encoding may be performed according to existing standard advanced video coding or high efficiency video coding to generate the stereoscopic image. The encoded data generated by the third system 150 may be transmitted to the second system 130 via the wireless communication.

The second system 130 may perform the video decoding using the encoded data received from the third system 150. The second system 130 may restore the encoded image through the video decoding. Here, the video decoding may be performed in a manner similar to the video encoding, and the stereoscopic video restored by the second system 130 may be played through the HMD device. In one embodiment, the second system 130 may generate and play the stereoscopic video according to the FOV determined based on the user's head movement and the movement of the vehicle. For example, the second system 130 may expand or cut an image to fit the displayed field of view of the user and then play the image through the HMD device.

Although exemplary embodiments of the present invention have been disclosed hereinabove, it may be understood by those skilled in the art that the present invention may be variously modified and altered without departing from the scope and spirit of the present invention described in the following claims.

The disclosed technology may have the following effects. However, since a specific embodiment is not construed as including all of the following effects or only the following effects, it should not be understood that the scope of the disclosed technology is limited to the specific embodiment.

The in-car cloud VR device and method according to the embodiment of the present disclosure can overcome the limitations of the physical space of the existing VR device and provide the effective VR/AR videos even in the vehicle traveling conditions.

The in-car cloud VR device and method according to the embodiment of the present disclosure may process the video in real time through the hybrid interworking between the cloud server and the VR device.

What is claimed is:

1. An in-car cloud VR device, comprising: an in-car mount device installed in a traveling vehicle, the in-car mount device comprising
    a plurality of cameras configured to collect a video around the traveling vehicle through at least one camera,
    a first GPS sensor configured to detect a location of the traveling vehicle,
    a first 6 DoF sensor, and
    a first computing device having a first memory configured to store first applications and one or more first processors coupled to the first memory, the first applications comprising a GIS and navigation application configured to acquire a GIS information around the traveling vehicle from the plurality of cameras, the first GPS sensor, and the first 6 Dof sensor;

a head-mount device installed in a VR device applied to a user, the head-mount device comprising a second GPS sensor, and a second 6 Dof sensor configured to acquire a movement information of the user in the traveling vehicle, a display, a second computing device having a second memory configured to store second applications and one or more second processors coupled to the second memory, the second applications comprising a local application configured to receive the GIS information from the GIS and navigation application, reprocess the received GIS information, and then transmit the reprocessed GIS information to the display, receive the video from the plurality of cameras, and receive data information from the second GPS sensor and the second 6 Dof sensor, reprocess the received data information, and transmit the reprocessed data information to the display; and a cloud VR server comprising a third computing device having a third memory configured to store third applications and one or more third processors coupled to the third memory, the third applications comprising a remote application configured to receive the GIS information, the video, and the data information from the local application, determine a first field of view (FOV) video based on the received GIS information, the video, and the data information, performing image rendering of the first FOV video, determine a second FOV video based on the image rendering of the first FOV video, and transmit the second FOV video to the display via the local application.

2. The in-car cloud VR device of claim 1, wherein the GIS and navigation application is configured to match a GPS signal acquired from the GPS sensor with GIS coordinates defined on a digital map and then acquire the GIS information.

3. The in-car cloud VR device of claim 1, wherein the local application is configured to receive a video from the plurality of cameras, divide the video into a plurality of frames, identify at least one dynamic object by image analysis for each frame, and acquire object information on the at least one dynamic object from a previously constructed object DB.

4. The in-car cloud VR device of claim 1, wherein the second 6 Dof sensor is a gyro sensor, wherein the local application is configured to measure head movement associated with a user's head through the gyro sensor, and generate head coordinate data on the head movement to determine a user's gaze direction.

5. The in-car cloud VR device of claim 1, wherein the first FOV video includes a stereoscopic video of a 360° field of view centered on a location of the traveling vehicle based on the GIS information.

6. The in-car cloud VR device of claim 5, wherein the remote application is configured to determine the second FOV video according to a gaze direction corresponding to a user's head movement, and perform Foveated Rendering on the first FOV video when the gaze direction is maintained for a predetermined time or longer to increase a resolution of an actual field of view expressed by the second FOV video.

7. The in-car cloud VR device of claim 1, wherein the third computing device includes:

an FOV determination module configured to receive information on the movement of the traveling vehicle and the user to determine first FOV video according to the location of the vehicle and the user's gaze direction;

a gaze video capture module configured to capture a gaze video for the first FOV video; and a video encoding module configured to encode the gaze video to generate stereoscopic video expressed to the user.

* * * * *